United States Patent
Choi et al.

(10) Patent No.: US 6,939,402 B2
(45) Date of Patent: Sep. 6, 2005

(54) CEMENT ADMIXTURE HAVING SUPERIOR WATER-REDUCING PROPERTIES AND METHOD FOR PREPARING THE SAME

(75) Inventors: Byeong-Gil Choi, Seoul (KR); Dong-Kyu Kang, Seoul (KR); Kwang-Myung Park, Naju (KR); Jong-Keun Song, Naju (KR); Chan-Young Lee, Daegu (KR); Hee-Bong Song, Naju (KR); Chang-Yeob Lee, Naju (KR); Dong-Duck No, Gwangju (KR); Dae-Joong Kim, Gwangju (KR)

(73) Assignee: LG Chem, Ltd., Seoul (KR)

( * ) Notice: Subject to any disclaimer, the term of this patent is extended or adjusted under 35 U.S.C. 154(b) by 53 days.

(21) Appl. No.: 10/732,496

(22) Filed: Dec. 10, 2003

(65) Prior Publication Data

US 2004/0118324 A1 Jun. 24, 2004

Related U.S. Application Data

(63) Continuation of application No. PCT/KR03/01257, filed on Jun. 26, 2003.

(30) Foreign Application Priority Data

Jun. 28, 2002 (KR) .................................... 2002-0037083

(51) Int. Cl.$^7$ .............................................. C04B 24/12
(52) U.S. Cl. ...................... 106/724; 106/727; 106/728; 106/823; 524/2
(58) Field of Search ............................... 106/724, 727, 106/728, 823; 524/2

(56) References Cited

U.S. PATENT DOCUMENTS

| 4,116,706 | A | | 9/1978 | Previte |
| 5,173,117 | A | | 12/1992 | Inokawa et al. |
| 5,674,316 | A | * | 10/1997 | Izumi et al. ................. 106/724 |
| 6,258,162 | B1 | * | 7/2001 | Kawakami et al. ......... 106/810 |
| 6,294,015 | B1 | * | 9/2001 | Yamashita et al. .......... 106/802 |
| 6,569,234 | B2 | * | 5/2003 | Yamashita et al. .......... 106/696 |
| 6,680,348 | B1 | * | 1/2004 | Amaya et al. ................. 524/2 |

FOREIGN PATENT DOCUMENTS

| EP | 0 983 976 A1 | 3/2000 |
| JP | 62 263279 | 11/1987 |
| JP | 05 238795 | 9/1993 |
| JP | 08 283350 | 10/1996 |
| JP | 91 42905 | 6/1997 |
| JP | 09-286645 | 11/1997 |
| JP | 10 194808 | 7/1998 |

* cited by examiner

*Primary Examiner*—Paul Marcantoni
(74) *Attorney, Agent, or Firm*—Alston & Bird LLP

(57) ABSTRACT

The present invention provides a cement admixture that comprises at least one of a carboxylic acid based copolymer comprising a reactive surfactant as a monomer or a copolymer salt obtained by neutralizing the copolymer with an alkaline substance, a method for preparing the same, and a cement composition comprising the same. The cement admixture of the present invention increases composition fluidity even at a high water-reducing formulation by improving dispersibility of cement particles, prevents a decrease of fluidity as the function of time, and offers good workability by supplying an adequate amount of air flow continuously.

16 Claims, No Drawings

CEMENT ADMIXTURE HAVING SUPERIOR WATER-REDUCING PROPERTIES AND METHOD FOR PREPARING THE SAME

CROSS-REFERENCE TO RELATED APPLICATIONS

This application is a continuation of PCT Application No. PCT/KR03/01257, filed Jun. 26, 2003, which designated the United States, and which is hereby incorporated herein in its entirety by reference, and claims the benefit of Korean Patent Application No. 2002-0037083, filed Jun. 28, 2002.

BACKGROUND OF THE INVENTION (a) Field of the Invention

The present invention relates to a cement admixture, and more particularly to a cement admixture for forming concrete with good strength and which improves dispersibility of cement particles, increases composition fluidity even at a high range water-reducing formulation, prevents a decrease of fluidity over time, and offers good workability by supplying an adequate amount of air flow continuously.

(b) Description of the Related Art

Cement compositions, such as concrete or mortar, are hydraulic substances that are hardened by reaction of cement and water. Physical properties of cement compositions, such as compressive strength after hardening, vary depending on the amount of water used. In general, while an increase in the amount of water used improves workability, it decreases compressive strength and causes cracking. Therefore, the amount of water used in cement compositions is limited. The Korean Industrial Standard (KS) F 2560 recommends use of a chemical admixture for concrete to reduce the amount of water used.

Chemical admixtures are classified as AE (air-entraining) admixtures, water-reducing admixtures, and high range water-reducing admixtures. The AE admixture is a chemical admixture comprised in a cement composition to increase the amount of small air bubbles, and it is mixed with a water-reducing admixture or a high range water-reducing admixture to form an AE water-reducing admixture (air entraining and water-reducing admixture) and a high range AE water-reducing admixture. When an AE water-reducing admixture is used, the amount of water used can be decreased by about 10 wt %, and a high range AE water-reducing admixture can reduce the amount of water used by more than 18 wt %.

The water-reducing admixture is made of a lignin compound, and the high range water-reducing admixture is made of a naphthalene-formalin condensate and a melamine condensate.

Because a slump loss of concrete in a cement composition occurs within 30 minutes, all work from concrete mixing to casting must be done in a short time. With the recent increase in unit content of water due to a change of aggregates, use of mechanized modern equipment, and an increase in traffic volume, a new chemical admixture having superior slump retention characteristics while having better water-reducing properties than the conventional AE water-reducing admixtures is required. Accordingly, admixture makers are actively developing high range AE water-reducing admixtures that have good water-reducing properties and low slump loss, and that can be added to the concrete composition at the concrete plant.

Currently, high range AE water-reducing admixtures, such as naphthalene sulfonic acid formaldehyde condensate salt (naphthalene based), melamine sulfonic acid formaldehyde condensate salt (melamine based), and Polycarboxylate(poly carboxylic acid based), are on the market. However, these high range water-reducing admixtures have some problems. For example, the naphthalene based and melamine based high range water-reducing admixtures have a problem of fluidity decrease (slump loss) while they have superior hardening characteristics. On the other hand, the biggest problem of the polycarboxylic acid based high range water-reducing admixtures is hardening retardation. However, with the recent development of a polycarboxylic acid based concrete admixture having superior fluidity, it is possible to obtain good fluidity by adding only a small amount, and the problem of hardening retardation is solved.

As a polycarboxylic acid based high range AE water-reducing admixture, Japan Patent Publication No. Sho 59-18338 discloses a copolymer prepared from a polyalkylene glycol mono(meth)acrylic acid ester monomer, a (meth)acrylic acid monomer, and a monomer that can be copolymerized with them. Additionally, Japan Patent Publication No. Hei 5-238795 discloses a copolymer prepared from a polyalkylene glycol diester monomer having an unsaturated double bond, a monomer having a dissociated group, and another specific monomer. While these polycarboxylic acid based high range AE water-reducing admixtures have good water-reducing properties and slump retention characteristics, there is much room for improvement.

Japan Patent Publication No. Sho 57-118058, Japan Patent Publication No. Hei 8-283350, Japan Patent Publication No. Hei 9-142905, and so forth disclose cement dispersing agents comprising a copolymer prepared from a polyethylene glycol monoallyl ether monomer and a maleic acid monomer. However, these cement dispersing agents do not have satisfactory dispersibility, especially at a high water-reducing formulations, because the polyethylene glycol monoallyl ether monomer and the maleic acid monomer are not easily copolymerized.

Japan Patent Publication No. Hei 10-194808 discloses a cement dispersing agent comprising a copolymer prepared from a polypropylene glycol polyethylene glycol mono(meth)allyl ether monomer and an unsaturated carboxylic acid monomer. Because this cement dispersing agent has a high hydrophobic polypropylene glycol content, it does not have sufficient dispersibility. Therefore, it should be added in a large amount to obtain sufficient dispersibility, and it is impossible to obtain sufficient dispersibility at a high water-reducing formulation.

SUMMARY OF THE INVENTION

An object of the present invention is to provide a cement admixture capable of improving dispersion stability of cement particles, and a method for preparing the same.

Another object of the present invention is to provide a cement admixture offering good workability to a cement composition by increasing fluidity of the cement composition even at the high water-reducing formulation, preventing a decrease of the fluidity as the function of time, and supplying an adequate amount of air flow continuously, and a method for preparing the same.

DETAILED DESCRIPTION OF THE PREFERRED EMBODIMENTS

To attain the objects, the present invention provides a cement admixture that comprises a carboxylic acid based copolymer comprising a reactive surfactant as a monomer, a copolymer salt obtained by neutralizing the copolymer with an alkaline substance, or both, and a method for preparing the same.

The present invention also provides a cement composition having superior fluidity even at a high water-reducing formulation, which comprises 0.01 to 10 parts by weight of the cement admixture for 100 parts by weight of cement.

Hereinafter, the present invention is described in more detail.

The present invention copolymerizes a copolymer comprising a carboxylic acid monomer with a reactive surfactant as a unit monomer. Thereby, the present invention offers dispersibility superior to that of the conventional cement admixture, increases fluidity of the cement composition even at a high water-reducing formulation, prevents a decrease of the fluidity as the function of time, and supplies an adequate amount of air flow continuously, so that it offers good workability to the cement composition.

The reactive surfactant, which is comprised in the copolymer of the present invention as a unit monomer, has both hydrophilic and hydrophobic groups, so that it increases solubility of the polymer in water. It also improves physical adsorptivity of cement particles to the polymer, so that it helps dispersion of the cement particles and maintenance of fluidity, and increases stability to bivalent ions comprised in the cement composition.

To be more specific, the carboxylic acid based copolymer of the present invention, which comprises a reactive surfactant as a unit monomer, preferably comprises:

a) 50 to 90 wt % of an alkoxypolyalkylene glycol mono (meth)acrylic acid ester monomer represented by the following Chemical Formula 1;

b) 5 to 45 wt % of a (meth)acrylic acid monomer represented by the following Chemical Formula 2, or a salt thereof; and c) 0.5 to 40 wt % of a reactive surfactant represented by the following Chemical Formula 3:

Chemical Formula 1

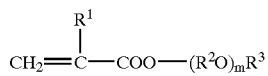

wherein:

$R^1$ is a hydrogen atom or methyl;

$R^2O$ is a $C_2$ to $C_4$ oxyalkylene, which may be identical or different and which may be added in block or random form in case they are different;

$R^3$ is a $C_1$ to $C_4$ alkyl; and m is the average addition moles of the oxyalkylene groups, which is an integer of 1 to 50;

Chemical Formula 2

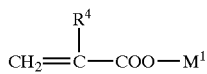

wherein:

$R^4$ is a hydrogen atom or methyl; and $M^1$ is a hydrogen atom, a monovalent metal atom, a bivalent metal atom, ammonium, or an organic amine; and Chemical Formula 3

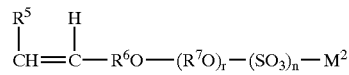

wherein:

$R^5$ is a hydrogen atom or methyl;

$R^6$ is a $C_1$ to $C_3$ alkylene, phenylene, or alkylphenylene;

$R^7O$ is a $C_1$ to $C_4$ oxyalkylene, which may be identical or different and which may be added in block or random form in case they are different;

r is the average addition moles of the oxyalkylene groups, which is an integer of 1 to 50;

n is 0 or 1; and $M^2$ is a hydrogen atom, a monovalent metal atom, ammonium, or an organic amine.

The reactive surfactant represented by Chemical Formula 3 has a double bond, which may participate in a radical reaction, so that it functions as a surfactant in the polymer main chain during copolymerization of the monomers. The hydrophobic part of the surfactant facilitates adsorption to cement particles, and the ionic part forms an electric double layer to increase the zeta potential and enhance electrostatic repulsion and stability of dispersion particles. Accordingly, the cement particles are dispersed by the hydrophilicity and steric hindrance of the polyalkylene glycol chain, and electrostatic repulsion due to the sulfonic acid at the terminus of the surfactant offers superior dispersibility and air entraining stability.

The monomer represented by Chemical Formula 1 may be chosen from methoxypolyethylene glycol mono(meth) acrylate, methoxypolypropylene glycol mono(meth) acrylate, methoxypolybutylene glycol mono(meth)acrylate, methoxypolyethylene glycol polypropylene glycol mono (meth)acrylate, methoxypolyethylene glycol polybutylene glycol mono(meth)acrylate, methoxypolypropylene glycol polybutylene glycol mono(meth)acrylate, methoxypolyethylene glycol polypropylene glycol polybutylene glycol mono(meth)acrylate, ethoxypolyethylene glycol mono (meth)acrylate, ethoxypolypropylene glycol mono(meth) acrylate, ethoxypolybutylene glycol mono(meth)acrylate, ethoxypolyethylene glycol polypropylene glycol mono (meth)acrylate, ethoxypolyethylene glycol polybutylene glycol mono(meth)acrylate, ethoxypolypropylene glycol polybutylene glycol mono(meth)acrylate, and ethoxypolyethylene glycol polypropylene glycol polybutylene glycol mono(meth)acrylate, which may be copolymerized with one another.

Preferably, the monomer represented by Chemical Formula 1 is comprised from 50 to 90 wt % in the copolymer. Beyond this range, it is difficult to attain good dispersibility.

The monomer represented by Chemical Formula 2 may be chosen from acrylic acid and methacrylic acid, and monovalent metal salts, bivalent metal salts, ammonium salts, and organic amine salts thereof, which may be copolymerized with one another.

Preferably, the monomer represented by Chemical Formula 2 is comprised from 5 to 45 wt % in the copolymer. Beyond this range, the slump loss prevention capacity of the cement composition may be lowered.

The reactive surfactant represented by Chemical Formula 3 has both hydrophobic and hydrophilic groups, and a double bond that can participate in a radical reaction.

Particularly, a polyoxyalkylene alkenyl ether sulfate is preferable. To be specific, it may be chosen from: sulfoxypolyalkylene glycol allyl ethers, such as sulfoxypolyethylene glycol allyl ether, sulfoxypolypropylene glycol allyl ether, sulfoxypolybutylene glycol allyl ether, sulfoxypolyethylene glycol 2-butenyl ether, sulfoxypolypropylene glycol 2-butenyl ether, sulfoxypolybutylene glycol 2-butenyl ether, sulfoxypolyethylene glycol 3-butenyl ether, sulfoxypolypropylene glycol 3-butenyl ether, sulfoxypolybutylene glycol 3-butenyl ether, sulfoxypolyethylene glycol 3-pentenyl ether, sulfoxypolypropylene glycol 3-pentenyl ether, and sulfoxypolybutylene glycol 3-pentenyl ether; sulfoxypolyalkylene glycol alkylvinylphenyl ethers, such as sulfoxypolyethylene glycol (3-vinyl-5-methyl)phenyl ether, sulfoxypolypropylene glycol (3-vinyl-5-methyl)phenyl ether, sulfoxypolybutylene glycol (3-vinyl-5-methyl)phenyl ether, sulfoxypolyethylene glycol (3-vinyl-5-ethyl)phenyl ether, sulfoxypolypropylene glycol (3-vinyl-5-ethyl)phenyl ether, sulfoxypolybutylene glycol (3-vinyl-5-ethyl)phenyl ether, sulfoxypolypropylene glycol (3-propenyl-5-propyl)phenyl ether, sulfoxypolybutylene glycol (3-propenyl-5-propyl) phenyl ether, sulfoxypolyethylene glycol (3-propenyl-5-butyl)phenyl ether, sulfoxypolypropylene glycol (3-propenyl-5-butyl)phenyl ether, and sulfoxypolybutylene glycol (3-propenyl-5-butyl)phenyl ether; 2-sulfoxypolyalkylene glycol-3-(4-alkylphenoxy) propyleneallyl ethers, such as 2-sulfoxypolyethylene glycol-3-(4-methylphenoxy)propyleneallyl ether, 2-sulfoxypolypropylene glycol-3-(4-methylphenoxy) propyleneallyl ether, 2-sulfoxypolybutylene glycol-3-(4-methylphenoxy)propyleneallyl ether, 2-sulfoxypolyethylene glycol-3-(4-ethylphenoxy)propyleneallyl ether, 2-sulfoxypolypropylene glycol-3-(4-ethylphenoxy) propyleneallyl ether, and 2-sulfoxypolybutylene glycol-3-(4-ethylphenoxy)propyleneallyl ether; and monovalent metal salts, bivalent metal salts, ammonium salts, and organic amine salts thereof. These monomers may be copolymerized with one another.

Preferably, the reactive surfactant represented by Chemical Formula 3 is comprised from 0.5 to 40 wt % in the copolymer. Beyond this range, the slump retention and air entraining capacity of the cement composition may be lowered.

The carboxylic acid based copolymer or neutralized salt thereof comprising the reactive surfactant as a unit monomer may be as represented by the following Chemical Formulas 4a, 4b, 4c, and 4d. However, it is not limited to them.

Chemical Formula 4a
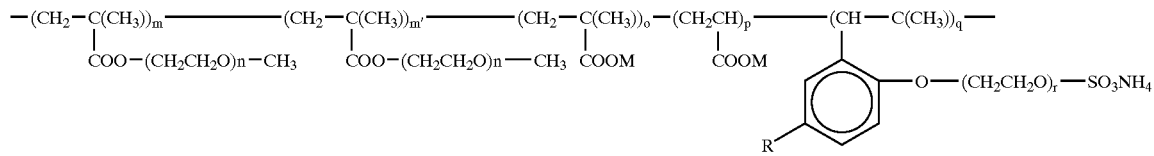

Chemical Formula 4b
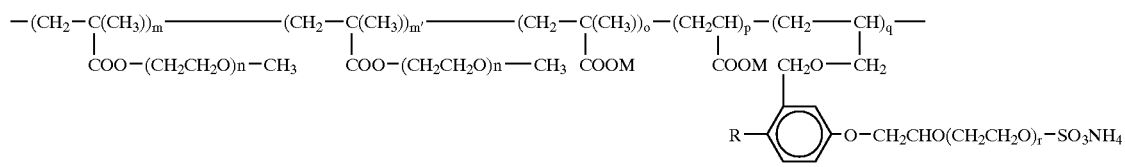

Chemical Formula 4c
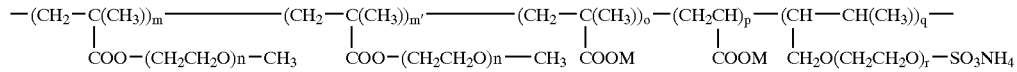

Chemical Formula 4d
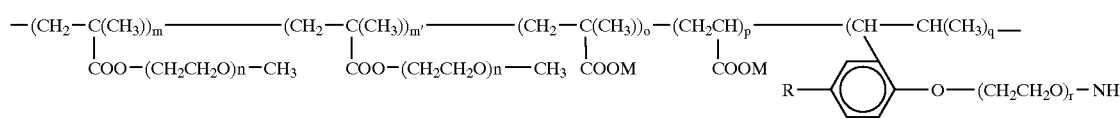

In Chemical Formulas 4a to 4d:

M is a hydrogen atom, or a monovalent or bivalent metal atom; R is hydrogen or an alkyl; and m, m', n, o, p, q, and r are molar ratios, wherein at least one of m and m' is not 0, at least one of o and p is not 0, and n, q, and r are not 0.

The ammonium of the terminus of the reactive surfactant may be replaced by a hydrogen atom or a monovalent metal atom.

The monomer components of the copolymer of the present invention may be copolymerized using a polymerization initiator. The copolymerization method is not particularly limited and it may be carried out by solution polymerization, mass polymerization, and so forth.

For example, in case water is used as a polymerization solvent, water-soluble polymerization initiators such as a persulfate of ammonium or an alkali metal, or hydrogen peroxide, can be used.

In case low alcohols, aromatic hydrocarbons, aliphatic hydrocarbons, ester compounds, or ketone compounds are used as a polymerization solvent, hydroperoxides such as benzoyl peroxide, lauroyl peroxide, and cumen hydroperoxide, or aromatic azo compounds such as azobisisobutyronitrile may be used as a polymerization initiator. Accelerators, such as amine compounds, may be used as well.

In case a water/low alcohol mixture solution is used, the above polymerization initiators or combinations of polymerization initiators and accelerators may be used.

Preferably, the polymerization initiator is used from 0.5 to 5 wt % of the total monomer weight.

Preferably, the polymerization temperature is selected from a range of 0 to 120° C. depending on the solvent or polymerization initiator used.

Also, a thiol based chain transfer agent may be used as well to control the molecular weight of the polymer. For the thiol based chain transfer agent, mercaptoethanol, thioglycerol, thioglycollic acid, 2-mercaptopropionic acid, 3-mercaptopropionic acid, thiomalic acid, thioglycollic acid octyl, 3-mercaptopropionic acid octyl, and so on may be used alone or in combination. Preferably, the thiol based chain transfer agent is used from 0.5 to 5 wt % of the total monomer weight.

The obtained polymer can be used as a main component of a cement admixture without further processing, or it may be neutralized with an alkaline substance to be used as a main component of a cement admixture, if required. For the alkaline substance, inorganic substances such as hydroxide, chloride, and a carbonate of a monovalent metal or bivalent metal, or an organic amine, can be used.

Preferably, the weight-average molecular weight of the copolymer and neutralized copolymer thereof is from 10,000 to 30,000, and more preferably from 15,000 to 20,000, when determined by GPC (gel permeation chromatography), considering the dispersibility.

Preferably, the cement admixture of the present invention is added from 0.01 to 10 parts by weight for 100 parts by weight of cement, in a cement composition such as concrete. Particularly, 0.1 to 5 parts by weight is more preferable, considering the high water-reducing formulation. A content exceeding 10 parts by weight is not desirable in terms of economic efficiency. Otherwise, if the content is below 0.01 parts by weight, the dispersibility, water-reducing properties, and air entraining capacity may be poor.

The cement admixture of the present invention reduces over 18 wt % of the water in concrete by improving dispersibility of cement particles. It increases fluidity of the composition even at the high water-reducing formulation, prevents a decrease of the fluidity over time, and offers good workability by supplying an adequate amount of air flow continuously, while having good strength.

Hereinafter, the present invention is described in more detail through Examples and Comparative Examples. However, the following Examples are only for the understanding of the present invention, and the present invention is not limited by the following Examples

EXAMPLES

Example 1

250 parts by weight of water were put in a 2 L glass reactor equipped with a thermometer, a stirrer, a dropping funnel, a nitrogen feed tube, and a reflux cooler. Nitrogen gas was fed into the reactor while stirring, and the reactor was heated to 80° C. under the nitrogen atmosphere.

Deionized water comprising 2 parts by weight of ammonium persulfate was added to the reactor. After the persulfate was dissolved, monomer mixture of 275.18 parts by weight of methoxypolyethylene glycol monomethacrylate (average addition moles of ethylene oxide=13 mol), 43.69 parts by weight of methacrylic acid, 25.11 parts by weight of acrylic acid, 7.02 parts by weight of polyoxyethylene nonylphenylpropenyl ether sulfate ammonium salt (average addition moles of ethylene oxide=10 mol) as a non-ionic and anionic reactive surfactant, 4.5 parts by weight of 3-mercaptopropionic acid and 130 parts by weight of water and aqueous initiator solution of 90 parts by weight of a 5 wt % ammonium persulfate aqueous solution were respectively added to the reactor dropwise over 3 hours. Then, 4 parts by weight of another 5 wt % ammonium persulfate aqueous solution was added at once. Polymerization was then carried out for 1 hour while keeping the temperature at 80° C.

After the polymerization was completed, the obtained polymer was cooled to room temperature and neutralized with a 30 wt % sodium hydroxide aqueous solution. The weight-average molecular weight of the prepared water-soluble copolymer salt measured by GPC was 18,591.

Example 2

A water-soluble copolymer salt was prepared as in Example 1, changing the average addition moles of ethylene oxide of the methoxypolyethylene glycol monomethacrylate to 30 mol. The weight-average molecular weight of this salt measured by GPC was 23,486.

Example 3

Polymerization was carried out as in Example 1, replacing the monomer solution with a mixture solution comprising 266.76 parts by weight of methoxypolyethylene glycol monomethacrylate (average addition moles of ethylene oxide=14 mol), 42.68 parts by weight of methacrylic acid, 24.01 parts by weight of acrylic acid, 17.55 parts by weight of polyoxyethylene nonylphenylpropenyl ether sulfate ammonium salt (average addition moles of ethylene oxide=10 mol) as a non-ionic and anionic reactive surfactant, 4.5 parts by weight of 3-mercaptopropionic acid, and 130 parts by weight of water.

After the polymerization was completed, the obtained polymer was cooled to room temperature and neutralized with a 30 wt % sodium hydroxide aqueous solution. The weight-average molecular weight of the prepared water-soluble copolymer salt measured by GPC was 16,931.

Example 4

Polymerization was carried out as in Example 1, replacing the monomer solution with a mixture solution comprising 259.04 parts by weight of methoxypolyethylene glycol monomethacrylate (average addition moles of ethylene oxide=14 mol), 36.39 parts by weight of methacrylic acid, 20.47 parts by weight of acrylic acid, 35.1 parts by weight of polyoxyethylene nonylphenylpropenyl ether sulfate ammonium salt (average addition moles of ethylene oxide=10 mol) as a non-ionic and anionic reactive surfactant, 4.5 parts by weight of 3-mercaptopropionic acid, and 130 parts by weight of water.

After the polymerization was completed, the obtained polymer was cooled to room temperature and neutralized with a 30 wt % sodium hydroxide aqueous solution. The weight-average molecular weight of the prepared water-soluble copolymer salt measured by GPC was 16,605.

Example 5

Polymerization was carried out as in Example 1, replacing the monomer solution with a mixture solution comprising 275.18 parts by weight of methoxypolyethylene glycol monomethacrylate (average addition moles of ethylene oxide=14 mol), 43.69 parts by weight of methacrylic acid, 25.11 parts by weight of acrylic acid, 7.02 parts by weight of allyloxyhydroxypropane sulfate sodium salt as an anionic reactive surfactant, 4.5 parts by weight of 3-mercaptopropionic acid, and 130 parts by weight of water.

After the polymerization was completed, the obtained polymer was cooled to room temperature and neutralized with a 30 wt % sodium hydroxide aqueous solution. The weight-average molecular weight of the prepared water-soluble copolymer salt measured by GPC was 15,415.

measured according to the Korean Industrial Standards KS F 2402 and KS F 449.

TABLE 1

| Classification | Polyalkylene glycol (meth)acrylate | | Carboxylic acid (methacrylic acid/acrylic acid) | Reactive surfactant | | Solid | Weight-average |
|---|---|---|---|---|---|---|---|
| | Moles of EO | Content (wt %) | Content (wt %) | Type | Content (wt %) | content (wt %) | molecular weight |
| Example 1 | 14 | 78.4 | 19.6 | Non-ionic + anionic | 2 | 40.1 | 18,591 |
| Example 2 | 30 | 78.4 | 19.6 | | 2 | 39.8 | 23,486 |
| Example 3 | 14 | 76.0 | 19.0 | | 5 | 40.1 | 16,931 |
| Example 4 | 14 | 73.8 | 16.2 | | 10 | 40.1 | 16,605 |
| Example 5 | 14 | 78.4 | 19.6 | Anionic | 2 | 40.0 | 15,415 |
| Comp. Example 1 | 14 | 80.0 | 20 | — | — | 40.2 | 27,287 |

Comparative Example 1

Polymerization was carried out as in Example 1, replacing the monomer solution with a mixture solution comprising 280.8 parts by weight of methoxypolyethylene glycol monomethacrylate (average addition moles of ethylene oxide=14 mol), 44.58 parts by weight of methacrylic acid, 25.62 parts by weight of acrylic acid, 4.5 parts by weight of 3-mercaptopropionic acid, and 130 parts by weight of water, excluding the reactive surfactant.

After the polymerization was completed, the obtained polymer was cooled to room temperature and neutralized with a 30 wt % sodium hydroxide aqueous solution. The weight-average molecular weight of the prepared water-soluble copolymer salt measured by GPC was 27,287.

Comparative Example 2

A naphthalene sulfonate formaldehyde (NSF) condensate, conventionally used as a cement admixture, was prepared.

Main components, contents, and properties of the water-soluble copolymer salts prepared in Examples 1 to 5 and Comparative Example 1 are shown in the following Table 1. The following Table 2 shows test results (cement mortar fluidity test and concrete test) for the water-soluble copolymer salts and the cement admixture of Comparative Example 2.

[Mortar Fluidity Test]

1000 g of portland cement (SsangYong Cement), 1000 g of sand, 1 g (solid content) of each cement admixture, and 450 g of water (tap water) were mixed at medium speed in a mortar mixer for 3 minutes to prepare mortar. Each prepared mortar sample was filled in a hollow cone having a diameter of 60 mm and a height of 40 mm. The cone was removed upwardly and the fluidity of the mortar (mm) was determined by averaging its diameter measured in two directions.

[Concrete Test]

736 kg of Portland cement (SsangYong Cement), 1863 kg of sand, 2330 kg of rubble, 0.25 wt % of each cement admixture for the cement weight (1.00 wt % for the cement admixture of Comparative Example 2), and 386.4 kg of water (tap water) were mixed to prepare concrete. Slump and air content of each prepared concrete sample were

TABLE 2

| Classification | Addition amount/ cement (wt %) | Cement paste fluidity (mm) | | Slump (cm) | | Air content (%) | |
|---|---|---|---|---|---|---|---|
| | | Initial | 30 min. later | Initial | 90 min. later | Initial | 60 min. later |
| Example 1 | 0.25 | 248 | 237 | 22.2 | 21.7 | 4.0 | 3.8 |
| Example 2 | 0.25 | 263 | 244 | 22.3 | 19.8 | 4.4 | 4.0 |
| Example 3 | 0.25 | 255 | 246 | 21.9 | 21.7 | 4.7 | 4.5 |
| Example 4 | 0.25 | 260 | 252 | 22.0 | 21.8 | 5.1 | 4.7 |
| Example 5 | 0.25 | 239 | 229 | 21.5 | 20.3 | 4.1 | 3.8 |
| Comp. Example 1 | 0.25 | 235 | 221 | 19.3 | 16.0 | 3.8 | 2.6 |
| Comp. Example 2 | 1.00 | 245 | 219 | 17.2 | 14.9 | 4.1 | 3.7 |

As seen from the test results, the mortar comprising the cement admixtures of Examples 1 to 5 had better fluidity, lower concrete slump loss after 90 minutes in spite of a higher initial slump, and superior air content, compared with the cement admixtures of Comparative Examples 1 and 2. This means that the cement admixture of the present invention improves dispersibility of cement particles, and offers better water-removing properties at a small amount.

The cement admixture of the present invention improves dispersibility of cement particles, increases composition fluidity even at a high water-removing region, prevents a decrease of fluidity over time, and offers good workability by supplying an adequate amount of air flow continuously.

While the present invention has been explained in detail with reference to the preferred embodiments, those skilled in the art will appreciate that various modifications and substitutions can be made thereto without departing from the spirit and scope of the present invention as set forth in the appended claims.

What is claimed is:

1. A cement admixture comprising a copolymer or copolymer salt obtained by neutralizing the copolymer with an alkaline substance;

wherein, the copolymer is obtained by copolymerizing a monomer mixture comprising a monomer represented by following Chemical Formula 1, a monomer presented by following Chemical Formula 2, and a reactive surfactant represented by following Chemical Formula 3:

Chemical Formula 1

$$CH_2=\underset{R^1}{C}-COO-(R^2O)_m R^3$$

wherein:

$R^1$ is a hydrogen atom or methyl;

$R^2O$ is a $C_2$ to $C_4$ oxyalkylene, wherein each of the one or more oxyalkylenes may be identical or different, and wherein the oxyalkylenes may be added in block or random form in case they are different;

$R^3$ is a $C_1$ to $C_4$ alkyl; and m is the average number of moles of the oxyalkylene groups, which is an integer from 1 to 50;

Chemical Formula 2

$$CH_2=\underset{R^4}{C}-COO-M^1$$

wherein:

$R^4$ is a hydrogen atom or methyl; and $M^1$ is a hydrogen atom, a monovalent metal atom, a bivalent metal atom, ammonium, or an organic amine; and Chemical Formula 3

$$\underset{R^5}{CH}=\underset{H}{C}-R^6O-(R^7O)_r-(SO_3)_n-M^2$$

wherein:

$R^5$ is a hydrogen atom or methyl;

$R^6$ is a $C_1$ to $C_3$ alkylene, phenylene, or alkylphenylene;

$R^7O$ is a $C_1$ to $C_4$ oxyalkylene, wherein each of the one or more oxyalkylenes may be identical or different, and wherein the oxyalkylenes may be added in block or random form in case they are different;

r is the average number of moles of the oxyalkylene groups, which is an integer from 1 to 50;

n is 0 or 1; and $M^2$ is a hydrogen atom, a monovalent metal atom, ammonium, or an organic amine.

2. The cement admixture according to claim 1, wherein the monomer mixture comprises:
 a) 50 to 90 wt % of the monomer represented by said Chemical Formula 1;
 b) 5 to 45 wt % of the monomer represented by said Chemical Formula 2; and
 c) 0.5 to 40 wt % of the reactive surfactant represented by said Chemical Formula 3.

3. The cement admixture according to claim 1, wherein the monomer represented by Chemical Formula 1 is one or more substances selected from the group consisting of methoxypolyethylene glycol monomethacrylate, methoxypolypropylene glycol monomethacrylate, methoxypolybutylene glycol monomethacrylate, methoxypolyethylene glycol polypropylene glycol monomethacrylate, methoxypolyethylene glycol polybutylene glycol monomethacrylate, methoxypolypropylene glycol polybutylene glycol monomethacrylate, methoxypolyethylene glycol polypropylene glycol polybutylene glycol monomethacrylate, ethoxypolyethylene glycol monomethacrylate, ethoxypolypropylene glycol monomethacrylate, ethoxypolybutylene glycol monomethacrylate, ethoxypolyethylene glycol polypropylene glycol monomethacrylate, ethoxypolyethylene glycol polybutylene glycol monomethacrylate, ethoxypolypropylene glycol polybutylene glycol monomethacrylate, ethoxypolyethylene glycol polypropylene glycol polybutylene glycol monomethacrylate, methoxypolyethylene glycol monoacrylate, methoxypolypropylene glycol monoacrylate, methoxypolybutylene glycol monoacrylate, methoxypolyethylene glycol polypropylene glycol monoacrylate, methoxypolyethylene glycol polybutylene glycol monoacrylate, methoxypolypropylene glycol polybutylene glycol monoacrylate, methoxypolyethylene glycol polypropylene glycol polybutylene glycol monoacrylate, ethoxypolyethylene glycol monoacrylate, ethoxypolypropylene glycol monoacrylate, ethoxypolybutylene glycol monoacrylate, ethoxypolyethylene glycol polypropylene glycol monoacrylate, ethoxypolyethylene glycol polybutylene glycol monoacrylate, ethoxypolypropylene glycol polybutylene glycol monoacrylate, and ethoxypolyethylene glycol polypropylene glycol polybutylene glycol monoacrylate.

4. The cement admixture according to claim 1, wherein the monomer represented by Chemical Formula 2 is one or more substances selected from the group consisting of acrylic acid, methacrylic acid, a monovalent metal salt, a bivalent metal salt, an ammonium salt, and an organic amine salt of the acids.

5. The cement admixture according to claim 1, wherein the reactive surfactant represented by Chemical Formula 3 is one or more substances selected from the group consisting of:
 sulfoxypolyalkylene glycol allyl ethers;
 sulfoxypolyalkylene glycol alkylvinylphenyl ethers; and
 2-sulfoxypolyalkylene glycol-3-(4-alkylphenoxy) propyleneallyl ethers salts obtained by neutralizing them with a monovalent metal, a bivalent metal, an ammonium salt, or an organic amine.

6. The cement admixture according to claim 1, wherein the weight-average molecular weight of the copolymer or the copolymer salt ranges from 10,000 to 30,000.

7. A cement composition comprising 0.01 to 10 parts by weight of the cement admixture according to claim 1 for 100 parts by weight of cement.

8. A method for preparing a cement admixture comprising:
 a) a step of copolymerizing:
  i) 50 to 90 wt % of a monomer represented by the following Chemical Formula 1;
  ii) 5 to 45 wt % of a monomer represented by the following Chemical Formula 2; and
  iii) 0.5 to 40 wt % of a reactive surfactant represented by the following Chemical Formula 3
 in the presence of a polymerization initiator:

Chemical Formula 1

$$CH_2=\underset{R^1}{C}-COO-(R^2O)_m R^3$$

wherein:

$R^1$ is a hydrogen atom or methyl;

$R^2O$ is a $C_2$ to $C_4$ oxyalkylene, wherein each of the one or more oxyalkylenes may be identical or different, and wherein the oxyalkylenes may be added in block or random form in case they are different;

$R^3$ is a $C_1$ to $C_4$ alkyl; and m is the average number of moles of the oxyalkylene groups, which is an integer of 1 to 50;

Chemical Formula 2

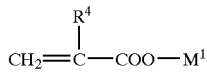

wherein:

$R^4$ is a hydrogen atom or methyl; and $M^1$ is a hydrogen atom, a monovalent metal atom, a bivalent metal atom, ammonium, or an organic amine; and Chemical Formula 3

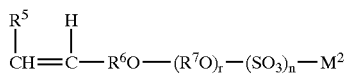

wherein:

$R^5$ is a hydrogen atom or methyl;

$R^6$ is a $C_1$ to $C_3$ alkylene, phenylene, or alkylphenylene;

$R^7O$ is a $C_1$ to $C_4$ oxyalkylene, wherein each of the one or more oxyalkylenes may be identical or different, and wherein the oxyalkylenes may be added in block or random form in case they are different;

r is the average addition moles of the oxyalkylene groups, which is an integer of 1 to 50;

n is 0 or 1; and $M^2$ is a hydrogen atom, a monovalent metal atom, ammonium, or an organic amine.

9. The method for preparing a cement admixture according to claim 8, which further comprises:

b) a step of neutralizing the copolymer prepared in the step a) with an alkaline substance.

10. The method for preparing a cement admixture according to claim 9, wherein the alkaline substance of the step b) is a hydroxide, chloride, or carbonate of a monovalent metal or bivalent metal, ammonia, or an organic amine.

11. The method for preparing a cement admixture according to claim 8, wherein the a) copolymerization is carried out by solution polymerization or mass polymerization.

12. The method for preparing a cement admixture according to claim 8, wherein the copolymerization temperature of the step a) ranges from 0 to 120° C.

13. The method for preparing a cement admixture according to claim 8, wherein a) the copolymerization is carried out by further adding a chain transfer agent having a thiol group.

14. The cement admixture of claim 5, wherein the sulfoxypolyalkylene glycol allyl ethers are selected from the group consisting of sulfoxypolyethylene glycol allyl ether, sulfoxypolypropylene glycol allyl ether, sulfoxypolybutylene glycol allyl ether, sulfoxypolyethylene glycol 2-butenyl ether, sulfoxypolypropylene glycol 2-butenyl ether, sulfoxypolybutylene glycol 2-butenyl ether, sulfoxypolyethylene glycol 3-butenyl ether, sulfoxypolypropylene glycol 3-butenyl ether, sulfoxypolybutylene glycol 3-butenyl ether, sulfoxypolyethylene glycol 3-pentenyl ether, sulfoxypolypropylene glycol 3-pentenyl ether, sulfoxypolybutylene glycol 3-pentenyl ether, and combinations thereof.

15. The cement admixture of claim 5, wherein the sulfoxypolyalkylene glycol alkylvinylphenyl ethers are selected from the group consisting of sulfoxypolyethylene glycol (3-vinyl-5-methyl)phenyl ether, sulfoxypolypropylene glycol (3-vinyl-5-methyl)phenyl ether, sulfoxypolybutylene glycol (3-vinyl-5-methyl)phenyl ether, sulfoxypolyethylene glycol (3-vinyl-5-ethyl)phenyl ether, sulfoxypolypropylene glycol (3-vinyl-5-ethyl)phenyl ether, sulfoxypolybutylene glycol (3-vinyl-5-ethyl)phenyl ether, sulfoxypolypropylene glycol (3-propenyl-5-propyl)phenyl ether, sulfoxypolybutylene glycol (3-propenyl-5-propyl)phenyl ether, sulfoxypolyethylene glycol (3-propenyl-5-butyl)phenyl ether, sulfoxypolypropylene glycol (3-propenyl-5-butyl)phenyl ether, sulfoxypolybutylene glycol (3-propenyl-5-butyl)phenyl ether, and combinations thereof.

16. The cement admixture of claim 5, wherein the 2-sulfoxypolyalkylene glycol-3-(4-alkylphenoxy) propyleneallyl ethers are selected from the group consisting of 2-sulfoxypolyethylene glycol-3-(4-methylphenoxy) propyleneallyl ether, 2-sulfoxypolypropylene glycol-3-(4-methylphenoxy)propyleneallyl ether, 2-sulfoxypolybutylene glycol-3-(4-methylphenoxy)propyleneallyl ether, 2-sulfoxypolyethylene glycol-3-(4-ethylphenoxy) propyleneallyl ether, 2-sulfoxypolypropylene glycol-3-(4-ethylphenoxy)propyleneallyl ether, 2-sulfoxypolybutylene glycol-3-(4-ethylphenoxy)propyleneallyl ether, and combinations thereof.

* * * * *